United States Patent [19]

Silverman

[11] 4,159,463
[45] Jun. 26, 1979

[54] METHOD OF THREE DIMENSIONAL SEISMIC PROSPECTING

[76] Inventor: Daniel Silverman, 5969 S. Birmingham St., Tulsa, Okla. 74105

[21] Appl. No.: 844,355

[22] Filed: Oct. 21, 1977

Related U.S. Application Data

[63] Continuation-in-part of Ser. No. 617,857, Sep. 29, 1975, Pat. No. 4,064,481, which is a continuation-in-part of Ser. No. 407,646, Oct. 18, 1973, Pat. No. 3,984,805.

[51] Int. Cl.² .............................................. G01V 1/36
[52] U.S. Cl. ...................... 340/15.5 CP; 340/15.5 CC
[58] Field of Search .................. 340/15.5 CC, 15.5 CP

[56] References Cited

U.S. PATENT DOCUMENTS

| | | | |
|---|---|---|---|
| 3,332,511 | 7/1967 | Silverman | 340/15.5 CP |
| 3,786,409 | 1/1974 | Sorkin | 340/15.5 CC |
| 3,885,225 | 5/1975 | Anstey et al. | 340/15.5 CP |

Primary Examiner—Nelson Moskowitz

[57] ABSTRACT

A method of seismic prospecting involving at least a first and second spaced apart vibratory sources, cotemporaneously vibrating with the same or different reference signals, and recording into a common geophone at a point distant from both sources. The method involves recording at least two records, one record includes the first vibrator V1 responsive to a first reference signal R1 and the second vibrator V2 responsive to a second reference signal R2. In the second record the second vibrator repeats the reference signal R2, while the first vibrator is responsive to the first reference signal R1, but in opposite phase, −R1. When the two received records are added, the components due to the first vibrator are in opposite phase or polarity, and cancel, leaving only the part due to the second vibrator. When the two records are subtracted, the part due to the second vibrator cancels, and all that remains is the part due to the first vibrator.

22 Claims, 3 Drawing Figures

METHOD OF THREE DIMENSIONAL SEISMIC PROSPECTING

CROSS-REFERENCE TO RELATED PATENTS

This application is a continuation-in-part of my copending application Ser. No. 617,857, filed Sept. 29, 1975 entitled, "Vibratory and Processing Systems for Vibratory Seismic Operations", now U.S. Pat. No. 4,064,481 which was a continuation-in-part of the then copending application Ser. No. 407,646, filed Oct. 18, 1973, now U.S. Pat. No. 3,984,805.

BACKGROUND OF THE INVENTION

1. Field of the Invention

This invention lies in the field of seismic geophysical prospecting. More particularly it is involved with vibratory sources, which are programmed by reference signals.

Still more particularly it is concerned with aerial coverage, currently known as Three Dimensional Mapping, or 3D seismic operations, in which a plurality of spaced apart seismic sources are used, recording into at least one common geophone line.

Still more particularly, the invention involves methods of separating, in the data processing, the seismic waves progressing separately from two simultaneous vibratory sources at spaced-apart points, to a common receiver.

2. Description of the Prior Art

In the prior art it has been the entire practice, in vibratory source operations, to use a single source recording into a plurality of receivers. Even though a plurality of vibratory sources may be used, so as to provide greater energy, all of the sources are placed close to each other, and all are synchronized to the same reference signal. Thus all of the seismic energy travels by a common path to the receivers or sensors.

More recently there has been some interest in the simultaneous use of a plurality of spaced apart vibratory sources each with a different reference signal. Silverman in U.S. Pat. No. 3,984,805 uses non-synchronized, non-phase-controlled spaced-apart vibrators, and separates the seismic components in the received signal on the basis of correlation with the separate reference signals. Anstey et al in their U.S. Pat. No. 3,885,225 uses separate reference signals in separate frequency bands, and separates the signal components in the received signal on the basis of correlation with the corresponding reference signals.

In this invention the method of separation of the seismic waves from the two or more sources is by a different method.

SUMMARY

It is a primary object of this invention to provide a system of 3D seismic operations using vibratory sources in which a plurality of spaced-apart vibrators can be used simultaneously, with the same or different reference signals.

It is a further object of this invention to provide a method of separating the seismic waves received from each of a plurality of spaced-apart vibrators, by a cancelling process.

These and other objects and advantages of this invention and a better understanding of the principles and details of the invention will be evident from the following description taken in conjunction with the appended drawings, in which: at least two vibratory sources, or vibrators, V1 and V2 are operated cotemporaneously, recording into each of a plurality of geophones in a selected linear, or aerial array.

The principle of separation can be described as follows:

Consider a single first vibrator V1 operating, responsive to, or under the control of, a first reference signal, R1. This signal R1 can be a conventional swept frequency signal, of a selected frequency range, starting time T1, and time duration D1. The vibrator can be phase-controlled (as conventionally operated) or non-phase-controlled. The reference signal can also be a pseudo-random, or other type of reference signal that can be used to control the vibrator.

The vibrator V1 is operated responsive to R1, and the seismic wave is detected and forms a first received signal, S1.

The vibrator is operated a second time with the same V1, however, this time the polarity of the reference signal is reversed or inverted. Let us call this $-R1$. With this inverted reference signal, the received signal will be identical to S1 only opposite, or inverted in polarity, or $-S1$.

Now, if these two records are added, the S1 and $-S1$ will cancel each other, and all that will remain will be noise. On the other hand, if the second record $-S1$ is reversed in polarity, the result will be identical (to an approximation) to the first record. Now the sum of these two records will be 2 S1, and the signal to noise ratio will be greater by $\sqrt{2}$.

To make use of this principle, consider a second vibrator V2 at point P2 spaced apart from P1, and responsive to a second reference signal R2. The operation of the two vibrators is cotemporaneous, that is, the two durations D1 and D2 overlap in time. They can both start at the same time or different times. Preferably the two durations D1 and D2 should be equal, although they need not be. If R1 and R2 are the same, it is then preferable that they start at different times.

On the first record S1 there will be two components, one due to R1, through V1, and the other due to R2 through V2. On the second record S2, there will be two components, one part due to $-R1$ through V1, and the other part, like on S1, of R2 through V2.

This situation can be represented by the following table:

|  | Vibrator V1 | Vibrator V2 |
| --- | --- | --- |
| Record S1 | R1 | R2 |
| Record S2 | $-R1$ | R2 |
| First Stock Sum of (S1) + (+S2) | 0 | 2R2 |
| Second Stock Sum of (S1) + ($-S2$) | 2R1 | 0 |

Thus, by stacking (S1)+(S2) the components of R1 cancel and all that is left is R2, and by stacking (S2)+($-S2$) the R2 cancels out, and all that is left is R1.

This type of operation can be expanded to 3, 4, 5, or more vibratory sources, as will be fully explained in connection with FIG. 1. Also the more vibrators, the more repetitions, of the vibrators are required, such as 2 repetitions for 2 vibrators; 4 repetitions for 3 vibrators; 8 repetitions for 4 vibrators, 16 repetitions for 5 vibrators, and so on.

Getting this many repetitions is no great problem, since with 3 or 4 synchronized vibrators 10–20 repetitions are required to get sufficient energy. Thus when the vibrators are used singly, at spaced locations, the number of repetitions are likely to be 3, 4, or 5 times this many, depending on the number of vibrators.

Of course the real value of this operation of miltiple, ndependent, spaced vibrators lies in the fact that with a single linear array of geophones and say three spaced vibrators, aligned transverse to the line of the array, three times the area of subsurface coverage will be provided at much less than three times the cost of 1 vibrator.

It will be clear also that instead of a single vibrator at each transverse position, two or more synchronized vibrators can be used.

When I speak of "reference signal," I mean a time function, for controlling a vibratory source. This can be a conventional swept frequency signal of selected frequency band, starting time, and time duration. It can also be a pseudo-random signal, or any selected signal, which the vibratory source can follow.

The vibratory source can be the conventional phase controlled vibrator, or it can be non-phase controlled. It can follow a sinusoidal reference signal, or a square wave reference signal.

When two vibrators are spaced apart with respect to each other, they are far enough apart so that they can be considered to be generating independent seismic signals which travel by different paths to the receivers, sensors, or geophones.

When vibrators are spaced apart and generate separate seismic signals, and operate cotemporaneously, at least some part of their seismic signals overlap in time, and it becomes important to be able to separate the two seismic signals, for purposes of determining 3 dimensional structure. This is the objective to which this invention is directed.

In this invention it is important to "invert" or change the "polarity" of a reference signal, such that when one record is made with the reference signal in "normal polarity," and another record is made in "inverted polarity" or "opposite polarity" or "opposite phase" then in stacking these 2 records, the result would theoretically be zero. In a practical case the two records may not completely cancel because of variation in phase shift in the vibrators, and other well known reasons. However, in general, the repeatability of seismic records is good, so that if the two records are added, they will substantially cancel each other, except for noise, while if they are subtracted, the result should be substantially double the amplitude of the first record. Here subtraction means addition in opposite, or inverted, phase or polarity.

It becomes important therefore, in using this invention, to drive the vibrator with a reference signal, either in normal polarity, or in inverted polarity. Also, in stacking received records there must be capability to stack the received signals, or records, or traces, in normal polarity or inverted polarity.

So if there are two vibrators V1 and V2 responsive to reference signals R1 and R2 respectively, to be able to separate the two seismic signals on a record, involves recording two records. In the first record the two vibrators respond to the two signals R1 and R2 directly. On the second record V1 responds to ($-R1$) and V2 to R2.

By directly stacking the two records, the V2 record is produced, and by inverting the second record and stacking, the V1 record is produced. This can be done even if R1 and R2 are the same reference signal. If R1 and R2 are different, then a further "cleaning up" of the record can be done by correlation with the appropriate reference signal.

A further development of this invention involves "inverting" or "changing the polarity" or "phase shifting by 180°," portions of one of the two reference signals. This is accomplished by modifying or altering the reference signal to have two or more portions, or elements, in half of which the signal is inverted. With two vibrators the total duration of the one or more elements that are direct (non-inverted) must be equal to the total duration of the elements which are inverted.

R1 is "modified" as above to $\overline{R1}$, and V1 is controlled by $\overline{R1}$, while V2 is controlled by R2. The record when correlated with $\overline{R1}$ will produce R1 and cancel R2, while correlating by R2 will produce R2 and cancel R1.

DESCRIPTION OF THE PREFERRED EMBODIMENTS

Figure 1:
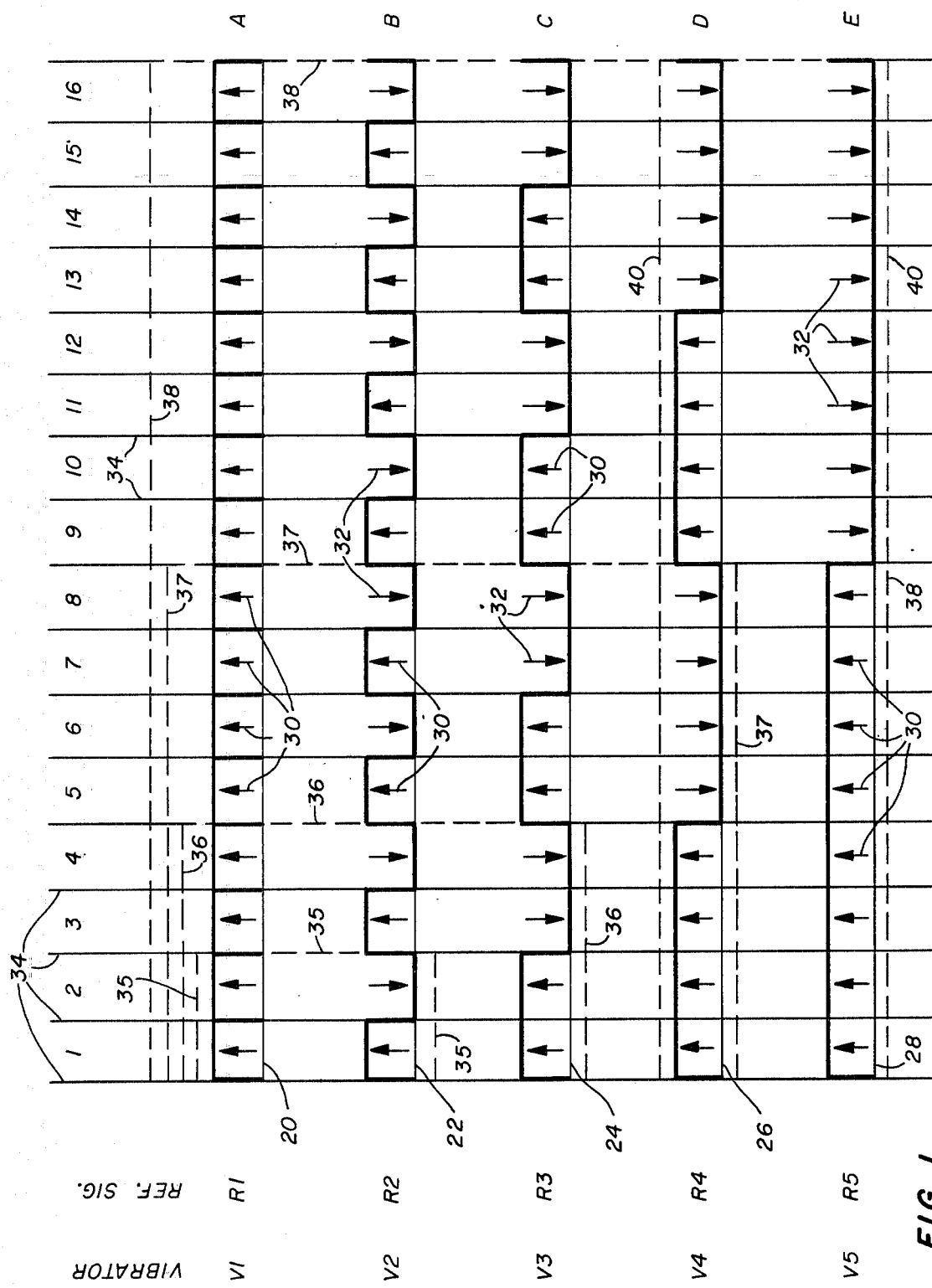
FIG. 1 indicates schematically the process of coding transmitted and received signals for operation with two-to-five spaced sources.

Referring now to the drawings, and in particular to FIG. 1, there is shown in outline, the manner of operating with up to 5 spaced apart vibrators V1, V2, V3, V4, V5, responsive respectively to five separate reference signals, R1, R2, R3, R4, R5. The column spaces 1, 2, 3, ... 16 between the vertical lines 34, represent separate records, the numbers at the tops of the columns 1–16 being the successive record numbers. These represent the records made with the vibrators at the same points P1, P2, P3, P4, P5, respectively, on a repetitive basis.

No attempt will be made to go into detail of how vibrators are constructed, or used, or operated, since all of this is well known, and need not be repeated. U.S. Pat. No. 3,984,805, which is made part of this application by reference, explains the use of vibrators. A further reason for not going into greater detail on the vibrators is because this invention is not limited to any particular type of vibratory source, provided it will follow the applied reference signal, both in a direct and in an inverted polarity manner.

Consider the case first of two vibrators V1 and V2, responsive to reference signals R1, R2 respectively. This is included in the dashed box 35. In record 1, R1 drives V1 in direct polarity (as represented by the up-pointing arrow 30). Also R2 drives V2 in direct polarity. In the second record R1 drives V1 and R2 drives V2 in opposite or reversed polarity. Or putting it another way, $-R2$ drives V2.

It will be seen (inside box 35) that if records 1 and 2 are stacked, or added, in direct polarity, R1 will be in phase on both records, while R2 will be in opposite phase, or polarity, on the two records, and will cancel. Conversely if record 2 is inverted and stacked, with record 1, R1 will be out of phase and R2 will be in phase.

Consider the case of 3, vibrators V1, V2, V3 responsive to R1, R2, R3 respectively, as outlined in dashed box 36. In recording records 1, 2, 3, 4, R1 is in direct polarity on all four records, while R2 is in direct polarity in records 1 and 3, and in reversed, or inverted polarity in records 2 and 4, while R3 is indirect polarity on records 1 and 2 but in reversed polarity on records 3 and 4.

If the 4 records are stacked directly, (that is, without any inverted records) R1 will be in phase on all 4 records and will sum to amplitude 4, while both R2 and R3 will be direct on 2 records and inverted on two records and will be cancelled. If the records are stacked by inverting records 2 and 4, then R2 will be in phase on all 4 and will sum to amplitude 4, while R1 and R3 will cancel. If the records are stacked by inverting records 3 and 4, then R3 will be in phase on all records and will add to amplitude 4, while R1 and R2 will cancel.

Thus three separate vibrators can use three similar, or different, reference signals and can be operated at spaced points, and, by recording at least 4 repetitive records, in proper codes of polarity, of reference signals, each of the three seismic waves received cotemporaneously can be separated by stacking the 4 records in 3 different codings, related to the codes of polarity by which the records were recorded.

By similar reasoning, the dashed box 37, involving the recording of 8 records with 4 vibrators illustrates how the 4 separate seismic signals can be separated. Also box 38 covering 16 repetitions illustrates the handling of 5 vibrators spaced apart, with the same or different reference signals.

Of course, after the two, three, four or five stacks or additions are made, the resulting stacked records must be correlated with the proper reference signal in accordance with the reference signal which is enhanced by the stacking.

It is not necessary to use box 35 with two vibrators. Box 40 illustrates how R4 through V4 and R5 through V5 can be used with 16 repetitions. If two vibrators are used, the number of repetitions (records) must be an even number, so that multiples of box 35 can be used. The order in which the records are recorded is not important. For example, in using R1 and R2 for 16 records, 8 records can be run with both R1 and R2 in standard or normal, or direct polarity, and then 8 records are run with R2 in inverted polarity.

Figure 2:
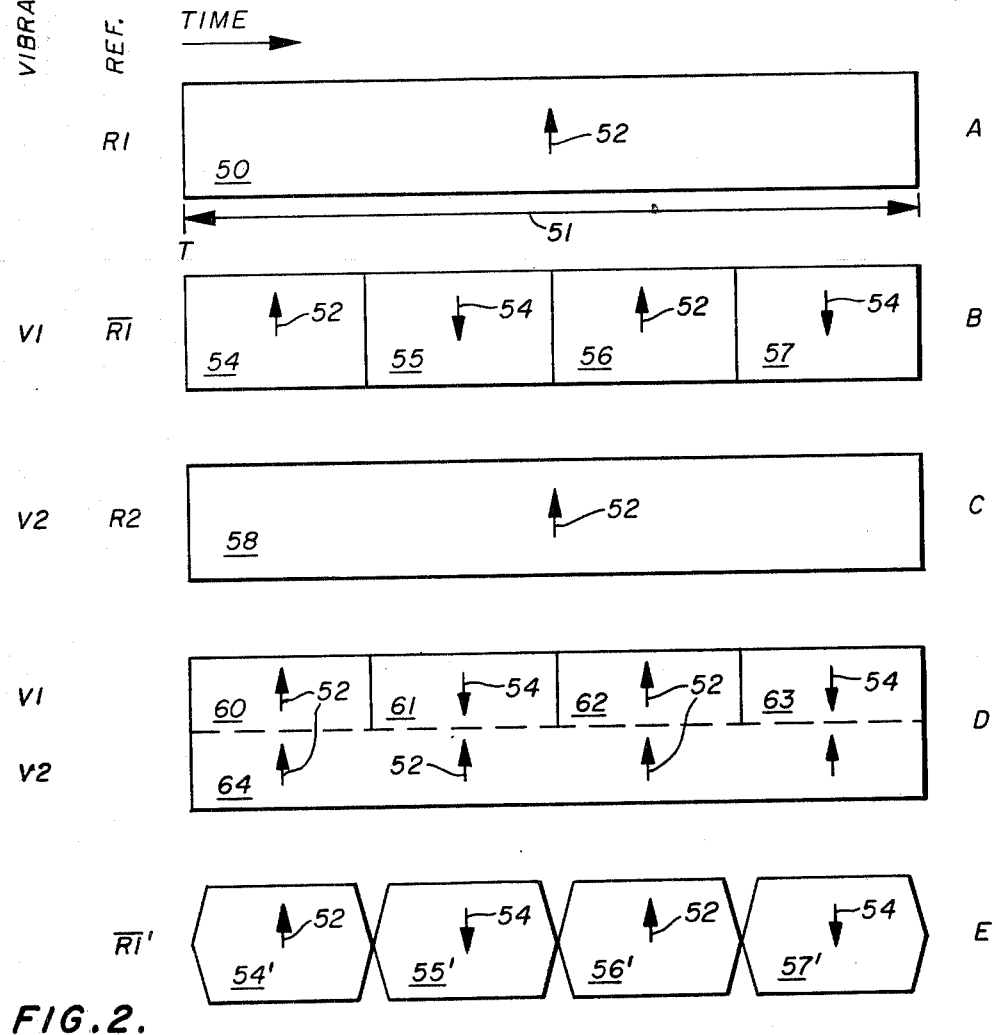
FIG. 2 illustrates a second method of coding transmitted and received signals.

Another embodiment based on this principle of cancellation is illustrated in FIG. 2.

Here are shown 5 boxes A, B, C, D, and E. Box A, 50, represents the envelope of an analog sweep reference signal R1. T represents the starting time, and S1 the duration of the signal. The arrow 52 indicates standard polarity, while 54 represents inverted polarity.

This reference signal has been changed, or modified, in accordance with box B, into 4 serial time segments, 54, 55, 56, 57, all of equal time duration. This is a modified reference signal $\overline{R1}$, which will operate through V1. This is the reference signal R1 with 2, 4, or more segments, half of which, 54, 56, are in direct polarity per arrows 52, and the other half of which, 55, 57, per arrows 54, are inverted polarity. Box C represents a second reference signal R2 operating through V2. R2 can be different from, or similar to, R1. R2 is run in normal polarity.

Box D represents a received record of V1 operated by $\overline{R1}$, and V2 operated by R2. This record is labelled S1, and consists of two seismic waves, which are superimposed, but for purposes of clarity, are shown side by side, labelled V1 and V2. V1 is a replica of Box D having 4 time segments 60, 61, 62, 63, coded in time and polarity, identically to $\overline{R1}$, from which it was derived.

The portion 64 of the record represents R2, and is in the same polarity as R2.

Consider that reference signals R1 and R2 are identical. Then if S1 is correlated with R2, (or R1) the component of V2 will be reproduced while the correlation of R1 with components of V1 will cancel to zero. This is because in half the duration of V1 the polarity of the record is the same as R1, and half the time it is inverted, so that in the summation of the products in the correlation process, half the products will be positive and half will be negative, and thus the sum will be zero.

On the other hand when S1 is correlated with $\overline{R1}$, the portion of the record due to V1 will be reproduced in the correlogram, while the part due to V2 will be cancelled.

This can be illustrated clearly by stating that:

correlation R1 * R1 will produce a correlogram
correlation R1 * $\overline{R1}$ will produce zero.

Thus even with the same reference signal, R1, and coding one vibrator in a particular time and polarity manner, will permit separating the two seismic signals.

While the modification $\overline{R1}$(t) shows abrupt reversals of phase, in order to satisfy the limitations of the vibrator, it may be desirable to taper the amplitude to zero at each reversal time, as shown in Box E.

This method can be expanded to more than two vibrators by using the type of coding illustrated in FIG. 1; that is, with three vibrators on the same or different reference signal R1, one modified signal would have, like $\overline{R1}$, 4 segments, successive ones direct, inverted, direct, inverted. The third vibrator would have a different modified signal $\overline{\overline{R1}}$, which would have two equal segments, the one direct and the other inverted, and so on.

The method of FIG. 2 has an important advantage in that each record has all the coding to separate the two or more signals, and does not require stacking to do the separation. Thus a system in which correlation is done before stacking, can handle this type of coding and separation. Thus, while each vibrator may have the same basic reference signal, they have different time and polarity coding on their particular reference signals.

While phase coding may have been used to separate signals on the basis of correlation, this system offers a type of time and phase coding that not only distinguishes against the differently coded signals, but if they have the same time duration, reduces the correlograms of the discarded signal to zero.

Figure 3:
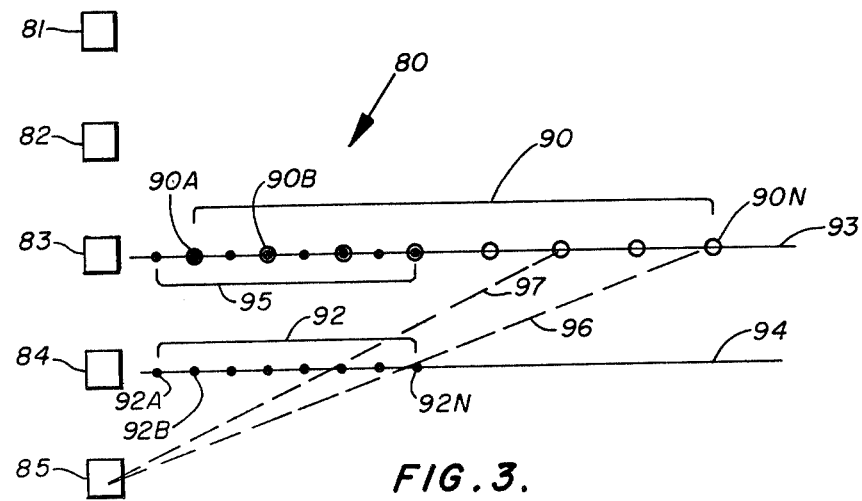
FIG. 3 illustrates in plan view one method of field operations.

While this description has been directed to a basic array of two spaced vibrators and one distant receiver, it can be modified to include almost any conceivable vibratory system array. In FIG. 3 is shown one array which has many operational and economic advantages (refer to Anstey U.S. Pat. No. 3,885,225).

Here a system 80 is shown with a line of geophones 90, along a line 93, and a vibrator 83. The result would be a plurality of subsurface reflection points 95. If an additional line 94 is to be surveyed, the entire operation is repeated along the line 94, (not shown) with vibrator at 84, to produce subsurface reflection points 92, by travel along the paths like 96, 97, etc. However, the same reflection points 92 can be recorded with geophones 90 along line 93, as shown, with vibrator 85. Thus by running vibrators 83 and 85 simultaneously, and separating the seismic signals by the means of this invention the two line coverage can be obtained simultaneously without moving the line of geophones 90.

Also, in accordance with Ser. No. 617,857 now U.S. Pat. No. 4,064,481, the received signals can be digitized to 1 bit, and the reference signals can be digitized to 1 bit, and correlations can be made on a 1 bit by 1 bit basis. This method is sensitive to phase reversals, or inversions, and therefore, the use of 1 bit digitizing eliminates problems of amplitude variations in the cancelling process.

While I speak of received records, in practice what are stacked are received traces. The nomenclature "stacking records" includes also "stacking traces."

The type of seismic operations illustrated in FIG. 3 is often called 3 Dimensional profiling, since the subsurface reflection points 95, 92, which are mapped simultaneously, and the corresponding deeper and/or shallower reflection points occupy a three-dimensional volume related to the two-dimensional array of surface vibrators and receivers. This type of operation is also called broadline profiling, since it maps a wider area than the subsurface line 95. Another way of describing this type of operation is that it provides subsurface cross dip information, as well as inline dip information, providing true dip of subsurface reflecting horizons.

The type of operation shown in FIG. 3 can be carried out with conventional explosive shots, or vibrators recorded successively, rather than cotemporaneously. But such a successive operation consumes a greater operating time than does the simultaneous, or cotemporaneous operation of this method.

If the separated vibrators are using the same reference signal it may be desirable to delay the initiation times. If they are using different reference signals this delayed initiation is not necessary.

A vibrator driven by an alternating reference signal creates a pulsating, or reversing, or alternating pressure on the earth. This creates a seismic wave in the earth, as is well known. This process can also be described by saying that the vibrator radiates seismic energy, or seismic waves, into the earth at the source point, or that it irradiates the earth with seismic waves.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of seismic prospecting in which a plurality of seismic vibratory sources, at a plurality of spaced source points, cotemporaneously radiate seismic signals into the earth, each source responsive to an individual reference signal; the seismic signals which travel by different paths and are received at a receiver and form a single composite received signal, comprising the steps of;
    (a) repeating said radiations from said spaced sources a plurality of times, each source using its same reference signal on each repetition and forming a plurality of composite received signals; each composite received signal including a component from each of said sources;
    (b) on each repetition of said sources coding the transmission from none, or some, but not all of said sources, in a selected first manner;
    (c) making at least one selected stack of said plurality of composite received signals, with none, or some, but not all of the individual composite received signals in said at least one stack being coded in a second manner, related to said first manner;
    whereby the result of said at least one stack is the summation of the repeated transmission components from a selected one of said plurality of spaced sources.

2. The method as in claim 1 in which said coding in said first manner involves inverting the polarity of at least one of said individual reference signals on a selected basis; and said coding in a second manner involves inverting the polarity of at least one selected composite received signal in said stack, in a selected manner.

3. The method as in claim 1 including the step of making as many selected stacks with corresponding selected coding, as there are spaced sources and source points; whereby the contribution received signal from each source point to said composite signal can be determined.

4. The method of seismic prospecting comprising;
    (a) providing a first selected reference signal R1(t) for a vibratory source, of selected time duration D1;
    (b) inverting the polarity of said reference signal during a selected portion of said duration D1 to form a first modified reference signal $\overline{R1}(t)$;
    (c) radiating a first seismic signal into the earth responsive to said first modified reference signal, $\overline{R1}(t)$ at a first point on the earth;
    (d) receiving the seismic signal radiated at said first point, at a second point distant from said first point, to provide a first received signal; and
    (e) correlating said first received signal with said modified first reference signal $\overline{R1}(t)$.

5. The method as in claim 4 in which said selected portion of said duration D1 is D½.

6. The method as in claim 5 in which said selected portion of said duration D1 comprises a plurality of spaced time segments;
    whereby the sum of the plurality of spaced time segments when said reference signal is inverted equals the sum of the time segments when said reference signal is not inverted.

7. The method of seismic prospecting comprising;
    (a) providing a first selected reference signal R1(t) for a vibratory seismic source, of selected time duration D1;
    (b) inverting the polarity of said reference signal during a selected portion of said duration D1 to form a first modified reference signal $\overline{R1}(t)$;
    (c) radiating a first seismic signal into the earth responsive to said first modified reference signal, $\overline{R1}(t)$ at a first point on the earth;
    (d) radiating a second seismic signal of time duration D2 into the earth responsive to a second reference signal R2(t) co-temporaneously with said first seismic signal, at a second point on the earth spaced from said first point;
    (e) receiving the seismic signals radiated at said first and second points, at a third point distant from said first and second points, to provide a first composite received signal, which includes components of both said first and second seismic signals; and (f) correlating said first composite received signal separately both with said modified first reference signal $\overline{R1}(t)$, and with said second reference signal, R2(t).

8. The method as in claim 7 in which said first and second reference signals are the same.

9. The method as in claim 7 in which said first and second reference signals are different.

10. The method as in claim 4 in which said modification comprises 4 equal time segments, with alternate segments of direct and inverted polarity.

11. The method as in claim 4 in which said modification comprises 2 equal segments, one of said segments direct, and the other of inverted polarity.

12. In the method of seismic prospecting in which at least a first and a second seismic source cotemporaneously radiate into the earth, first and second vibratory seismic signals responsive respectively to a first and to a second reference signal, at first and second spaced-apart points, respectively, which seismic signals are received at a third point spaced from said first and second points, to form a composite received signal, the method of separating from said composite received signal one of said first and second seismic signals comprising;
(a) coding in a first selected manner said first reference signal prior to said radiation;
(b) coding said composite received signal in a second selected manner related to said first selected manner, to provide a first coded composite received signal;
(c) repeating the transmissions from said first and second sources, without coding either of said sources; and
(d) producing a second uncoded composite received signal.

13. The method of seismic prospecting comprising
(a) generating a first train of time-spaced unidirectional electrical pulses of continually changing time interval between adjacent pulses;
(b) inverting alternate pulses of said train to provide a second train of alternately reversing electrical pulses;
(c) responsive to said second train, applying to the earth a corresponding train of alternately reversing forces at a first point on the earth; and
(d) detecting the seismic waves generated by said train of alternately reversing forces after passing through the earth, at a second point distant from said first point.

14. The method as in claim 12 in which said selected stack comprises;
adding said coded first composite received signal, and said uncoded second composite signal;
whereby the sum will be a function substantially of the seismic signal from said first source.

15. The method as in claim 12 in which said selected stack comprises;
subtracting from said uncoded second composite signal, said first coded composite signal;
whereby the remainder will be a function substantially of the seismic signal from said second source.

16. The method as in claim 12 in which said two sources have the same starting time and same time duration.

17. The method as in claim 12 in which said two sources have different starting times but overlap in time duration.

18. The method as in claim 12 in which said first and second reference signals are the same.

19. The method as in claim 12 in which said first and second reference signals are different.

20. The method as in claim 1; and wherein
(d) there are two spaced apart source points P1, P2;
(e) there are two cotemporaneous reference signals R1, R2;
(f) there are two vibratory sources V1, V2;
(g) there are at least a first and a second raidation from both sources, which provide a first and a second composite received signal;
(h) on the first radiation coding only first source V1 by reversing the polarity of reference signal R1;
(i) On the second radiation coding neither of the sources.

21. The method as in claim 1; and wherein
(d) there are three source spaced points P1, P2, P3;
(e) there are three cotemporaneous reference signals R1, R2, R3;
(f) there are three vibratory sources V1, V2, V3;
(g) there are at least four successive radiations;

| (h) | | | |
|---|---|---|---|
| on the first radiation | V1(Direct) | V2(Direct) | V3(Direct) |
| on the second radiation | V1(Direct) | −V2(Inverted) | V3(Direct) |
| on the third radiation | V1(Direct) | V2(Direct) | −V3(Inverted) |
| on the fourth radiation | V1(Direct) | −V2(Inverted) | −V3(Inverted) |
| (i) | | | |
| the first stack is; | | S1 + S2 + S3 + S4; | |
| the second stack is; | | S1 − S2 + S3 − S4; | |
| the third stack is; | | S1 + S2 − S3 − S4. | |

22. The method as in claim 1; and wherein
(d) there are four spaced apart source points P1, P2, P3, P4;
(e) there are four cotemporaneous reference signals R1, R2, R3, R4;
(f) there are four vibratory sources V1, V2, V3, V4;
(g) there are at least eight successive radiations;

| (h) | | | | |
|---|---|---|---|---|
| on the first radiation | +V1 | +V2 | +V3 | +V4; |
| on the second radiation | +V1 | −V2 | +V3 | +V4; |
| on the third radiation | +V1 | +V2 | −V3 | +V4; |
| on the fourth radiation | +V1 | −V2 | −V3 | +V4; |
| on the fifth radiation | +V1 | +V2 | +V3 | −V4; |
| on the sixth radiation | +V1 | −V2 | +V3 | −V4; |
| on the seventh radiation | +V1 | +V2 | −V3 | −V4; |
| on the eighth radiation | +V1 | −V2 | −V3 | −V4; |
| (i) | | | | |
| the first stack is; | | | S1 + S2 + S3 + S4 + S5 + S6 + S7 + S8; | |
| the second stack is; | | | S1 − S2 + S3 − S4 + S5 − S6 + S7 − S8; | |
| the third stack is; | | | S1 + S2 − S3 − S4 + S5 + S6 − S7 − S8; | |
| the fourth stack is; | | | S1 + S2 + S3 + S4 − S5 − S6 − S7 − S8. | |

* * * * *